(12) United States Patent
Yamauchi

(10) Patent No.: US 7,916,145 B2
(45) Date of Patent: Mar. 29, 2011

(54) DRAWING APPARATUS AND DOTTED LINE DRAWING METHOD

(75) Inventor: Hideaki Yamauchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1237 days.

(21) Appl. No.: 11/494,623

(22) Filed: Jul. 28, 2006

(65) Prior Publication Data

US 2007/0229454 A1 Oct. 4, 2007

(30) Foreign Application Priority Data

Mar. 28, 2006 (JP) ................................ 2006-089467

(51) Int. Cl.
*G06F 15/00* (2006.01)
*G06T 1/00* (2006.01)
*G06T 11/20* (2006.01)
*G06T 11/00* (2006.01)
*G09G 5/00* (2006.01)
*G09G 5/02* (2006.01)

(52) U.S. Cl. ........ 345/501; 345/581; 345/596; 345/611; 345/441; 345/467

(58) Field of Classification Search .................. 345/501, 345/581, 596, 611, 441, 467
See application file for complete search history.

(56) References Cited

U.S. PATENT DOCUMENTS

| | | | | |
|---|---|---|---|---|
| 4,969,201 A | * | 11/1990 | Takasaki et al. | 382/199 |
| 4,975,853 A | * | 12/1990 | Shimizu et al. | 700/182 |
| 6,496,198 B1 | * | 12/2002 | Wang | 345/629 |
| 2006/0109512 A1 | * | 5/2006 | Kuno | 358/3.06 |

FOREIGN PATENT DOCUMENTS

| | | |
|---|---|---|
| JP | 11-316851 A | 11/1999 |
| JP | 2000-151983 A | 5/2000 |
| JP | 2003-076995 A | 3/2003 |
| JP | 3524380 B2 | 5/2004 |

OTHER PUBLICATIONS

Japanese Notice of Rejection Grounds, English-language translation, mailed Jan. 25, 2011 for corresponding Japanese Application No. 2006-089467, 6 pages.

* cited by examiner

*Primary Examiner* — Xiao M Wu
*Assistant Examiner* — David T Welch
(74) *Attorney, Agent, or Firm* — Fujitsu Patent Center

(57) ABSTRACT

The challenge of the present invention is to prevent a crook line part of a dotted line from being displayed in half tone. The present invention is contrived to calculate a center coordinate of a texture pixel in a zone including a reference texture beginning point coordinate S_Begin as reference texture corrected beginning point coordinate S_Begin'. It is followed by calculating a center coordinate of a texture pixel in a zone including a reference texture end coordinate S_End as reference texture corrected end coordinate S_End'. A crook line part of a dotted line is drawn by fixing a reference coordinate to the S_Begin' or S_End' if a pixel to be drawn exists within a fixing section.

10 Claims, 12 Drawing Sheets

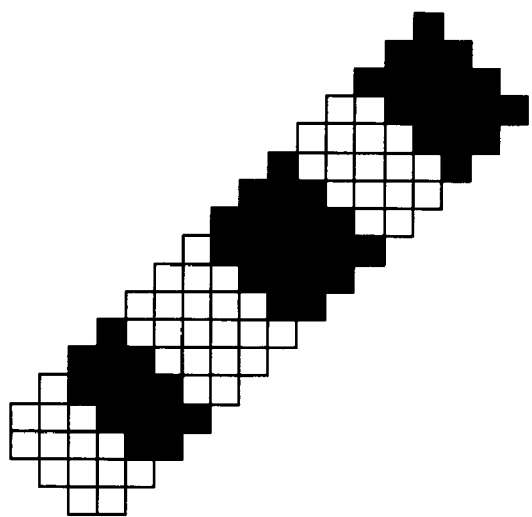 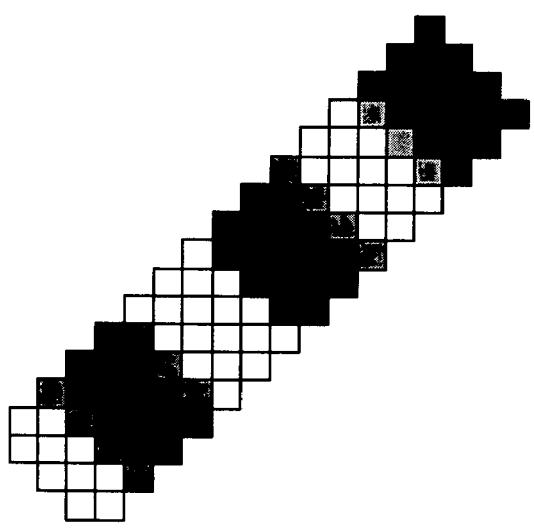
F I G. 4 A    F I G. 4 B

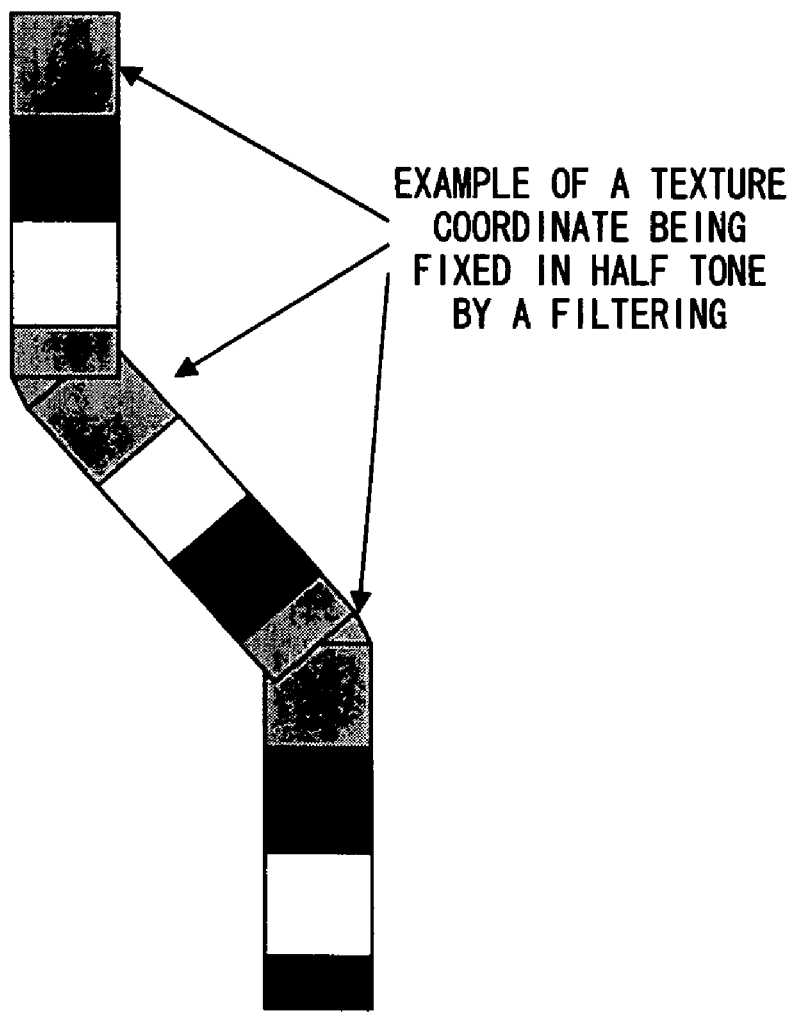
F I G. 5

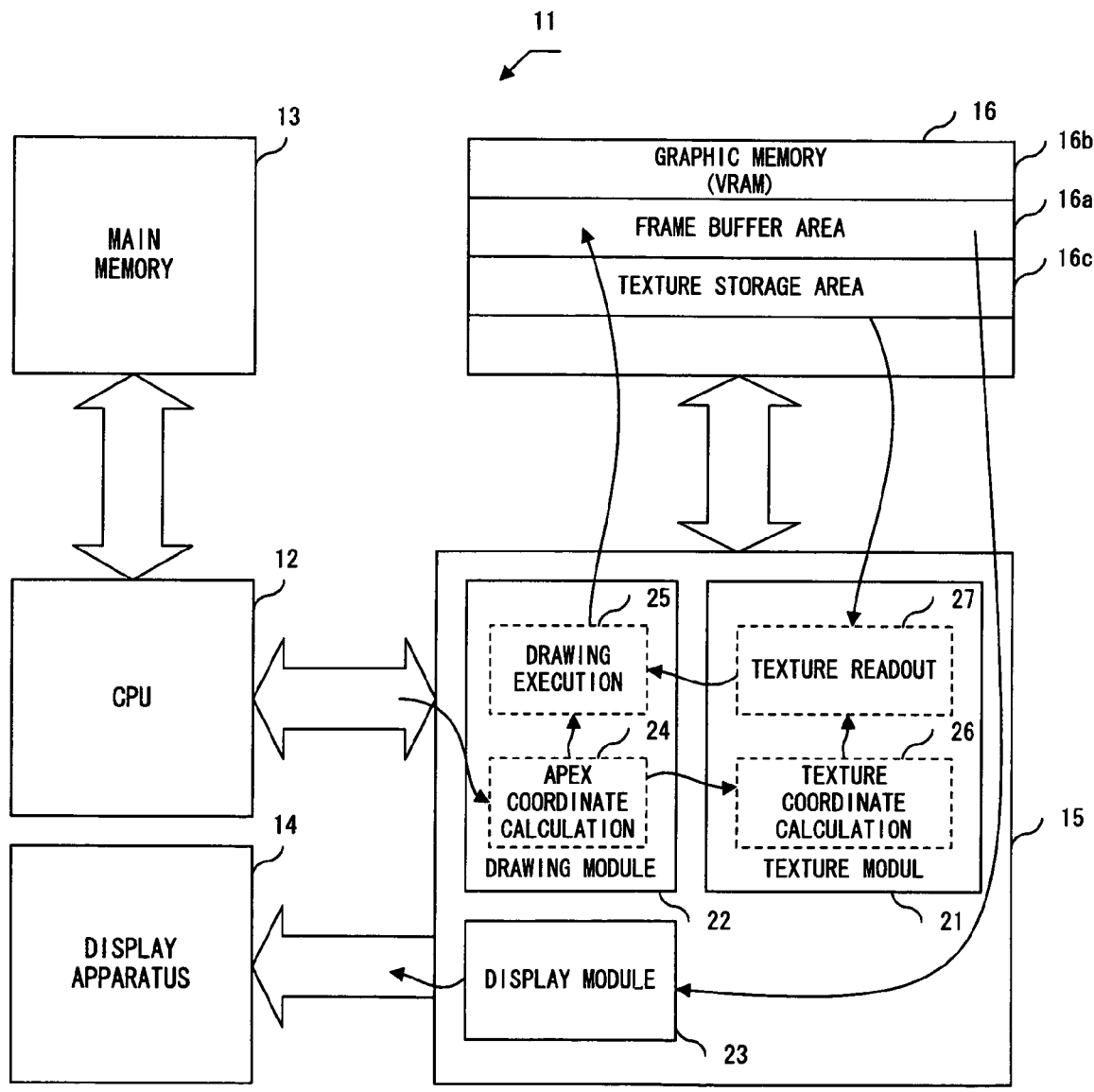
F I G. 7

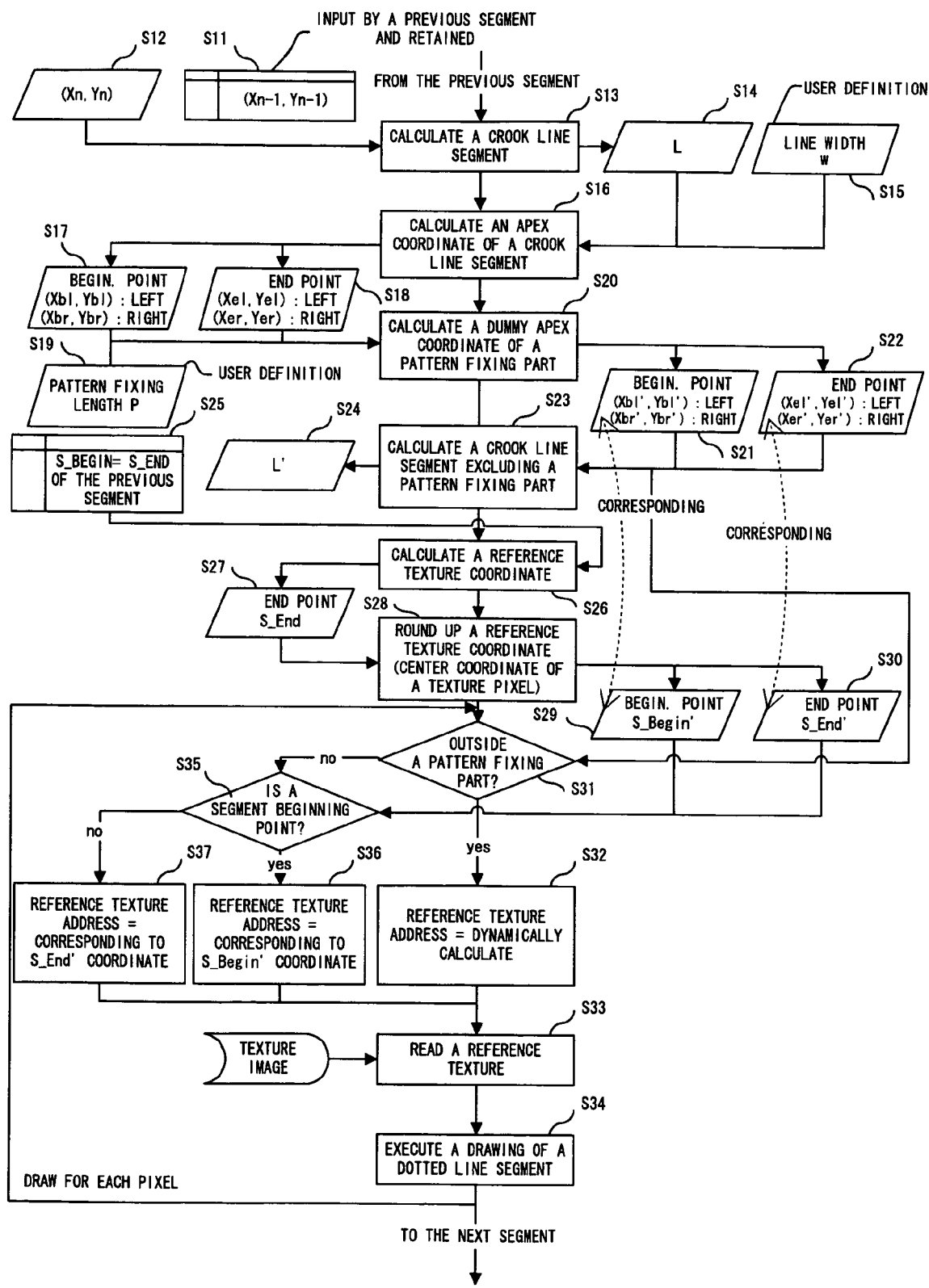
F I G. 8

DRAWING APPARATUS AND DOTTED LINE DRAWING METHOD

CROSS-REFERENCE TO RELATED APPLICATIONS

This application is based upon and claiming the benefit of priority from the prior Japanese Patent Application No. 2004-089467 filed in Mar. 28, 2006, the entire contents of which are incorporated herein by reference.

BACKGROUND OF THE INVENTION

1. Field of the Invention

The present invention relates to a drawing apparatus drawing a dotted line and its drawing method.

2. Description of the Related Art

A drawing apparatus such as a computer aided design (CAD) apparatus and a map display apparatus is equipped with a function of displaying a dotted line, et cetera.

A patent document 1 notes recognition of a dotted line pattern by numerical data of a painting and a gap pitches when drawing a dotted line by using a predetermined dotted line pattern and a calculation of these pitches by using a characteristic of similarity of a triangle, thereby drawing the dotted line more naturally.

A patent document 2 notes an equipment of means for calculating a beginning point of the second straight line or straight dotted line, and thereafter, thereby making it possible to draw an edge part of a bold dotted line or an edge part of each segment of a bold dotted line.

The conventionally practiced is to display various forms of dotted lines by using reference images thereof.

FIG. 1 is a diagram showing a reference texture of a dotted line. FIG. 1 shows a reference texture in which two pixels of white and black pixels continue alternately. The arrows on the bottom side of the reference texture indicate reference coordinates and the designation of reference coordinates S0, S1, et cetera, makes it possible to read pixel data in sequence.

FIG. 2 is a diagram (1) describing a conventional drawing method for drawing a dotted line by using the reference texture shown by FIG. 1.

In the conventional method for drawing a dotted line, drawing pixel data designated by the reference coordinate S2, followed by drawing pixel data designated by the reference coordinate S3 is faced with the problem of a dotted line patterns overlapping with each other in the part shown by the dotted circle in FIG. 2, resulting in deforming the pattern.

The accordingly considered has been to draw a crook line part by using the same pixel data by fixing the crook line part to the coordinate of the reference coordinate S2 for example when drawing the crook line part of a dotted line, as shown in a diagram (2) of FIG. 2 describing a conventional drawing method for drawing a dotted line. Unnatural overlap of a dotted line pattern has been prevented by fixing a reference coordinate as described above.

Incidentally, in the case of drawing a thick black and white dotted line diagonally and displaying it in a display apparatus, there has been a problem of a contour of the dotted line being displayed jaggedly as shown in FIG. 4A. In order to alleviate such uneasiness in terms of a display, what has been practiced is to make the jagged contour inconspicuous by filtering the dotted line by a half tone as shown in FIG. 4B.

However, a gradation display of a dotted line and a drawing of the same pixel data by fixing a reference coordinate as shown in FIG. 3 result in the entire crook line part being drawn by half tone pixel data as shown in FIG. 5 if the pixel data to be drawn is fixed by the reference coordinate of half tone pixel data. As a result, there has been a possible problem of the straight line part of the dotted line being displayed in black, while the crook line part thereof being displayed in a half tone, resulting in the color of the dotted line being not displayed uniformly, as shown in FIG. 5.

[Patent document 1] Japanese Registered Patent No. 3524380 (i.e., Laid-Open Japanese Patent Application Publication No. 11-316851)

[Patent document 2] Laid-Open Japanese Patent Application Publication No. 2003-76995

SUMMARY OF THE INVENTION

The challenge of the present invention is to prevent the entirety of a crook line part of a dotted line from being displayed in a half tone for a drawing apparatus equipped with the function of displaying a dotted line in gradation.

According to the present invention, a drawing apparatus equipped with the function of displaying a dotted line in gradation comprises: a reference image storage unit for storing a reference dotted line image for drawing the dotted line; a judgment unit for judging whether or not a pixel to be drawn exists within a fixing section of a dotted line pattern; and a drawing unit for drawing the pixel within the fixing section by fixing it to pixel data other than that of the reference dotted line image corresponding to a beginning point of the fixing section if the pixel to be drawn is judged, by the judgment unit, to exist within the fixing section of the dotted line pattern.

This invention makes it possible to prevent the entirety of a crook line part of a dotted line from being drawn in a half tone, thereby enabling an improvement of a display quality of the drawing apparatus.

The drawing apparatus according to the present invention comprises a first reference coordinate calculation unit for calculating a first reference coordinate of the reference dotted line image corresponding to a beginning point of the fixing section and a second reference coordinate calculation unit for calculating a second reference coordinate for designating pixel data of a specific foreground color pixel or background color pixel by applying a coordinate conversion process to the first reference coordinate calculated by the first reference coordinate calculation unit, wherein the drawing unit draws a crook line part of the dotted line by fixing the pixel within the fixing section to pixel data designated by the second reference coordinate.

Such a configuration makes it possible to draw the pixel of the crook line part of the dotted line by fixing it to pixel data designated by the second reference coordinate other than the first reference coordinate corresponding to the beginning position of the fixing section. Therefore, it is possible to draw the crook line part of the dotted line by pixel data of a foreground color pixel or a background color pixel in place of a half tone.

The drawing apparatus according to the present invention comprises a dummy apex coordinate calculation unit for calculating a position which is advanced toward an inside from an edge part of a segment by a predetermined distance as a dummy apex coordinate of a dummy apex in the case of drawing the dotted line with a crook line part by using a plurality of segments, wherein the judgment unit judges whether or not the pixel to be drawn exists within the fixing section between the dummy apex and edge part of the segment.

Such a configuration makes it possible to draw pixels within the fixing section between the dummy apex and the edge part of the segment by being fixed by pixel data of a white pixel or black pixel without a gradation which is designated by the second reference coordinate other than pixel data, with a gradation, which is designated by the first reference coordinate, for example. This configuration makes it possible to prevent the entirety of the crook line part of the dotted line from being drawn by a half tone.

The drawing apparatus according to the present invention comprises a segment coordinate calculation unit for calculating a coordinate of an edge part of a segment in the case of drawing the dotted line with a crook line part by using a plurality of segments, and a dummy apex coordinate calculation unit for calculating a position which is advanced toward an inside from an edge part of the segment by a predetermined distance as a dummy apex coordinate of a dummy apex, wherein the judgment unit judges whether or not the pixel to be drawn exists within the fixing section between the dummy apex coordinate and coordinate of the edge part of the segment.

Such a configuration makes it possible to judge whether or not the pixel to be drawn exists within the fixing section determined by the dummy apex coordinate and the coordinate of an edge part of the segment and draw the pixel within the fixing section by fixing it to pixel data of a foreground color pixel or a background color pixel designated by the second reference coordinate. This configuration makes it possible to prevent the entirety of the crook line part of the dotted line from being drawn by a half tone.

The drawing apparatus according to the present invention comprises a segment coordinate calculation unit for calculating coordinates of both of edge parts of a segment in the case of drawing the dotted line with a crook line part by using a plurality of segments, and a dummy apex coordinate calculation unit for calculating a position which is advanced toward the center direction from both of edge parts of the segment by a predetermined distance as a dummy apex coordinate of a dummy apex on the beginning point side, or that of a dummy apex on the end point side, wherein the judgment unit judges whether or not the pixel to be drawn exists within the fixing section between the dummy apex coordinate of the end point of the first segment and the end edge of the first segment, or within the fixing section between the beginning edge of a the econd segment and the dummy apex coordinate on the beginning point side of the second segment.

Such a configuration makes it possible to judge whether or not the pixel to be drawn exists within the section between the dummy apex on the end point side of one segment and the end edge of the segment, or the section between the beginning edge of another segment and the dummy apex on the beginning point side of the segment, and draw the pixel within the fixing section by fixing it to pixel data of a foreground color pixel or a background color pixel designated by the second reference coordinate based on the judgment result. This configuration makes it possible to prevent the entirety of the crook line part of the dotted line from being drawn by a half tone.

The drawing apparatus according to the present invention comprises a first reference coordinate calculation unit for calculating a first reference coordinate of the reference dotted line image corresponding to a beginning point of the fixing section, and a second reference coordinate calculation unit for applying a coordinate conversion process to the first reference coordinate calculated by the first reference coordinate calculation unit, thereby calculating a second reference coordinate of the center, or close thereto, of a zone of a foreground color or background color pixel, wherein the drawing unit draws a crook line part of the dotted line by fixing the pixel within the fixing section to pixel data designated by the second reference coordinate if the pixel to be drawn is judged, by the judgment unit, to exist within the fixing section.

The drawing apparatus according to the present invention comprises a first reference coordinate calculation unit for calculating a first reference coordinate of the reference dotted line image corresponding to a beginning point of the fixing section, a second reference coordinate calculation unit for calculating a second reference coordinate for designating pixel data of a specific foreground color pixel or background color pixel by applying a coordinate conversion process to the first reference coordinate calculated by the first reference coordinate calculation unit, and a dummy apex coordinate calculation unit for calculating a position which is advanced toward an inside from the end edge of the segment by a predetermined distance as a dummy apex coordinate on the end point side, or calculating a position which is advanced toward an inside from the beginning point of the segment by a predetermined distance as a dummy apex coordinate on the beginning point side, in the case of drawing the dotted line with a crook line part by using a plurality of segments, wherein the judgment unit judges whether or not a coordinate of the pixel to be drawn exists within the fixing section between the dummy apex coordinate on the end point side of a first segment and the end edge thereof, or within the fixing section between the beginning edge of a second segment following the first segment and the dummy apex coordinate on the beginning point side of the second segment, and the drawing unit draws a the crook line part of the dotted line by fixing the pixel within the fixing section to pixel data designated by the second reference coordinate if the pixel to be drawn is judged, by the judgment unit, to exist within the fixing section.

The above described configuration makes it possible to draw the pixel within teh fixing section by fixing it to specific pixel data designated by the second reference coordinate which is obtained by converting the first reference coordinate. This configuration makes it possible to prevent the entirety of the crook line part of the dotted line from being drawn by a half tone.

BRIEF DESCRIPTION OF THE DRAWINGS

FIGS. 4A and 4B are diagrams showing a dotted line interpolated by a half tone;

FIG. 5 is a description chart of a problem in the case of filtering by a half tone;

FIG. 7 is a block diagram of a drawing apparatus according to the embodiment;

FIG. 8 is a flow chart of a dotted line drawing process according to the embodiment;

DESCRIPTION OF THE PREFERRED EMBODIMENTS

Figure 1:
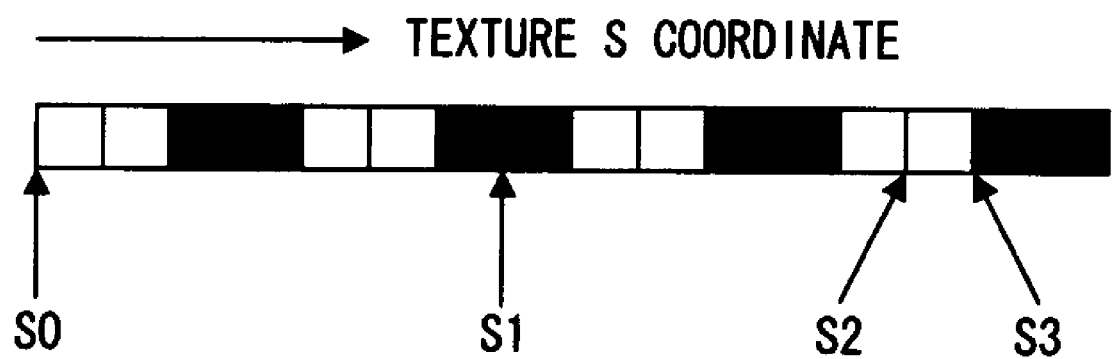
FIG. 1 is a diagram showing a reference texture.
Figure 2:
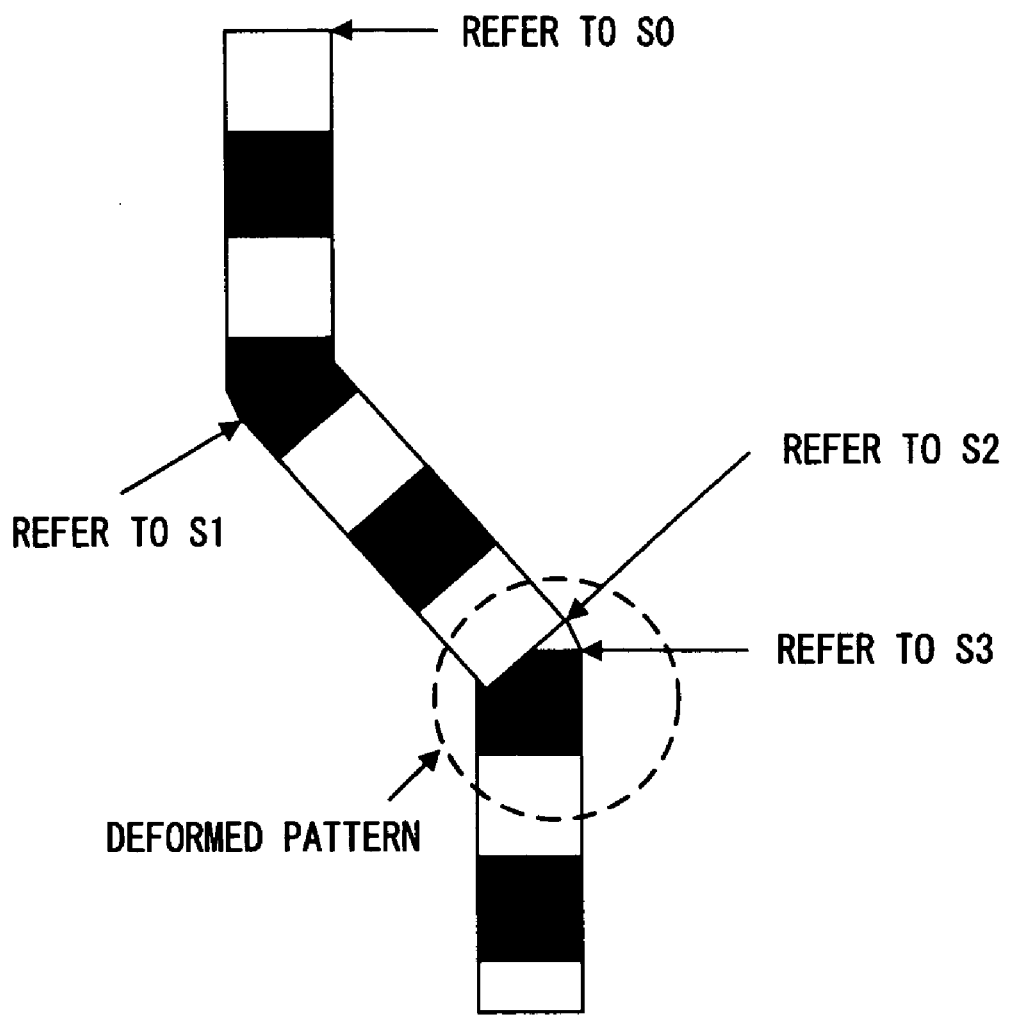
FIG. 2 is a description diagram of a conventional dotted line drawing method (1)
Figure 3:
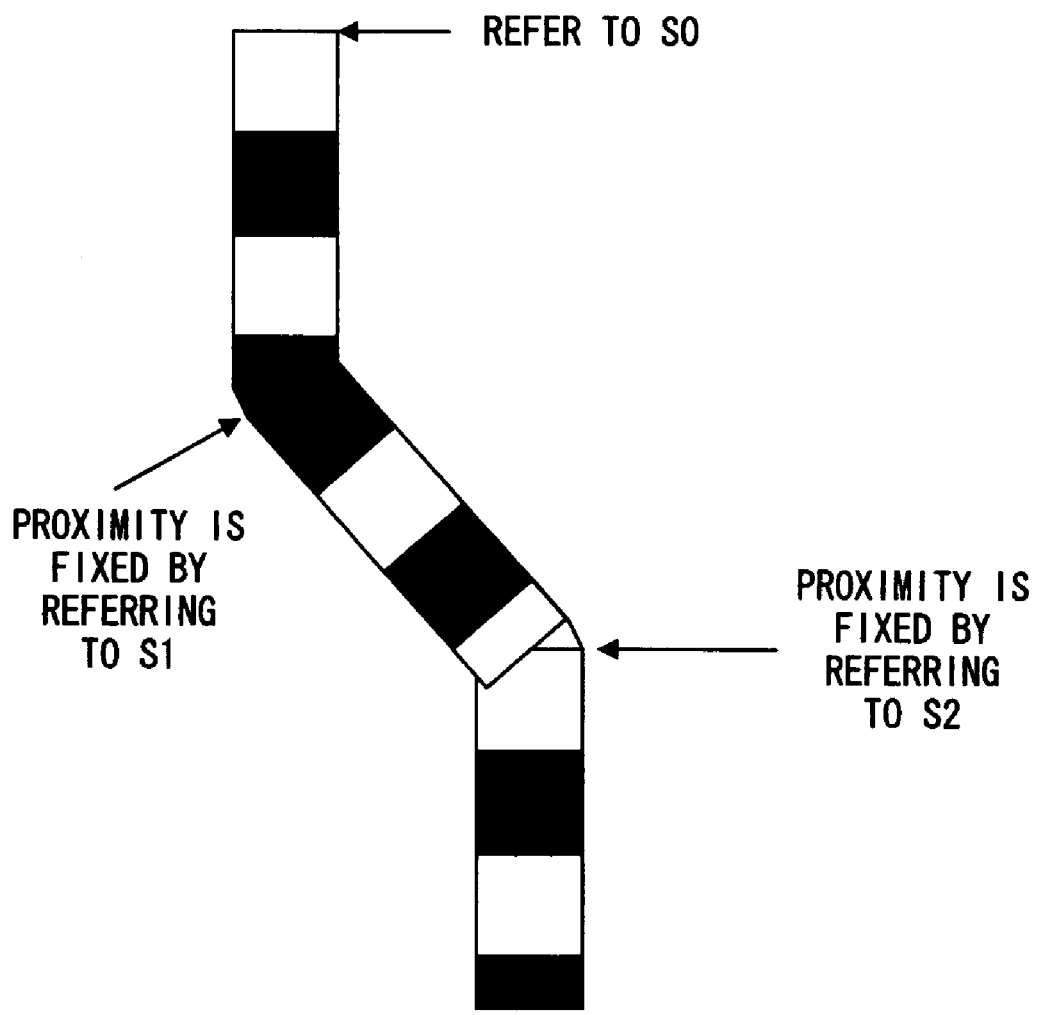
FIG. 3 is a description diagram of a conventional dotted line drawing method (2)
Figure 6:
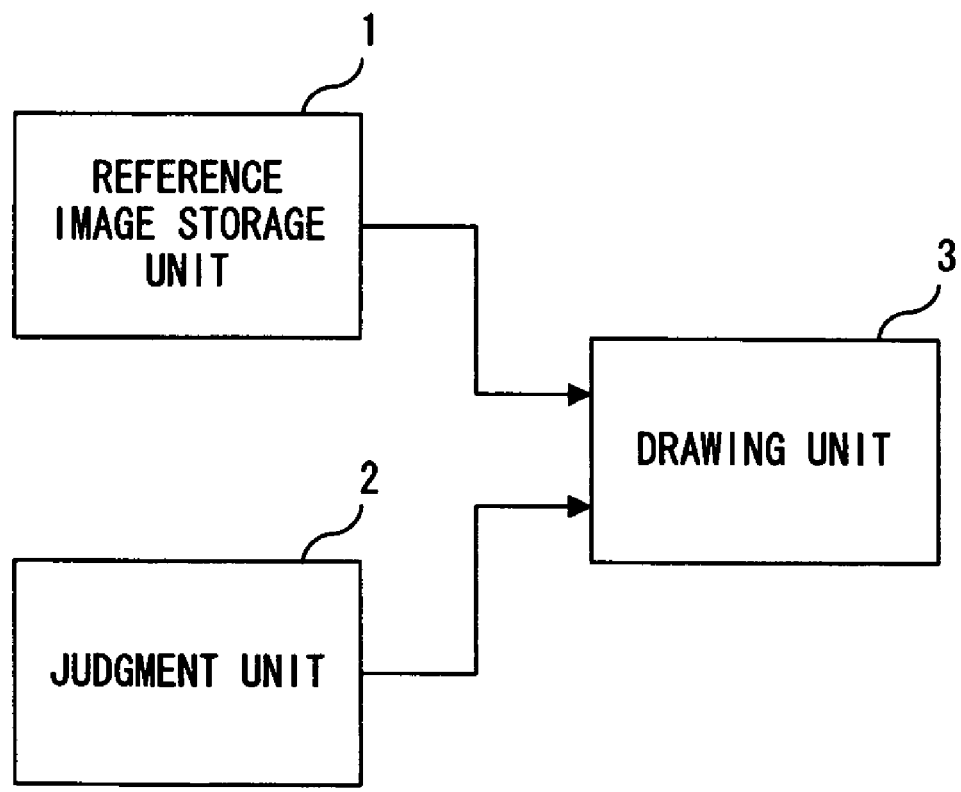
FIG. 6 is a diagram showing a fundamental comprisal of a drawing apparatus according to an embodiment.

The following is a description of the preferred embodiment of the present invention by referring to the accompanying drawings. FIG. 6 is a diagram showing a fundamental comprisal of a drawing apparatus according to an embodiment of the present invention.

According to the embodiment, a drawing apparatus equipped with the function of displaying a dotted line in gradation comprises a reference image storage unit 1 for storing a reference dotted line image for drawing a dotted line; a judgment unit 2 for judging whether or not a pixel to be drawn exists within a fixing section of a dotted line pattern; and a drawing unit 3 for drawing a pixel within a fixing section of a dotted line pattern by fixing it to pixel data other than that of the reference dotted line image corresponding to a beginning point of the fixing section if a pixel to be drawn is judged, by the judgment unit, to exist within the fixing section of the dotted line pattern.

This drawing apparatus makes it possible to prevent the entirety of a crook line part of a dotted line from being drawn by a half tone, thereby enabling an improvement of a display quality of the drawing apparatus.

FIG. 7 is a block diagram of a drawing apparatus 11 according to the embodiment. The drawing apparatus 11 includes a CPU 12, main memory 13, a display apparatus 14, a graphic LSI 15 and image memory 16.

The image memory 16 (corresponding to the reference image storage unit) comprises a frame buffer area 16a for storing image data for one frame, a graphic memory (VRAM) 16b for storing image data, and a texture storage area 16c for storing a dotted line texture pattern (corresponding to the reference dotted line image). The texture storage area 16c stores pixel data of a reference-use dotted line pattern by correlating with a coordinate.

The graphic LSI 15 comprises a texture module 21, a drawing module 22 and a display module 23.

The drawing module 22 includes an apex coordinate calculation unit (corresponding to the segment coordinate calculation unit and dummy apex coordinate calculation unit) 24 and a drawing execution unit (corresponding to the drawing unit) 25. The apex coordinate calculation unit 24 calculates an apex coordinate of a segment used for drawing a dotted line, while the drawing execution unit 25 writes, to the frame buffer area 16a, pixel data obtained from a dotted line texture pattern.

The texture module 21 includes a texture coordinate calculation unit 26 and a texture readout unit 27. The texture coordinate calculation unit (corresponding to the first and second reference coordinate calculation units) 26 calculates a texture coordinate corresponding to an apex coordinate of a segment which is calculated by the apex coordinate calculation unit 24 and a texture coordinate obtained by applying a coordinate conversion process to the texture coordinate, while the texture readout unit 27 reads pixel data of a dotted line texture pattern from the texture storage area 16c based on the calculated texture coordinate. The pixel data read by the texture readout unit 27 is output to the drawing execution unit 25 which in turn writes it to the frame buffer area 16a as display data of a later described crook line segment.

The display module 23 reads the pixel data of the crook line segment of a dotted line from the frame buffer area 16a and displays in the display apparatus 14.

The next description is of a drawing process in the case of drawing a thick dotted line (comprising a line width of a plurality of pixels) by the above noted drawing apparatus 11 by referring to the flow chart shown by FIG. 8.

The dotted line drawing process according to the present embodiment is configured to draw a connection part between segments by fixing it by specific pixel data, thereby drawing a crook line part of a dotted line. The following description calls the segment as crook line segment.

The dotted line drawing process retains the end point coordinate (Xn−1, Yn−1) of a previous crook line segment (n−1) in a register (S11 in FIG. 8). It retains the end point coordinate (Xn, Yn) of the current crook line segment (n) in a register (S12). It sets the endpoint coordinate (Xn−1, Yn−1) of the previous crook line segment (n−1) as the beginning point coordinate of the current crook line segment (n) and calculates a segment length L of the current crook line segment (n) (S13). Note that the end point coordinate (Xn−1, Yn−1) of a crook line segment means the coordinate of the center axis (indicating the axis 11 shown in FIG. 10B) of a crook line segment having a certain line width.

The segment length L is calculated by an expression, for example:

$$L=\{\{Xn-(Xn-1)\}^2+\{Yn-*(Yn-1)\}^2\}^{1/2}, \text{ where}$$
"^m" means the m-th power.

The process retains the calculated segment length L in a register (S14). A user defines a line width W of a dotted line to be drawn in advance (S15).

The process calculates an apex coordinate of the current crook segment (n) from the already defined line width W and the length of the current crook line segment (n) (S16).

The processes of the steps S17 and S18 shows detailed contents of the calculation process of the above described apex coordinate. The step S17 calculates a beginning point coordinate (Xbl, Ybl) on the left, and a beginning point coordinate (Xbr, Ybr) on the right, on the beginning point side (or the beginning edge) of a crook line segment; where the post-fix "b" indicates a beginning point "begin", the "l" indicates a coordinate on the left side, and the "r" indicates a coordinate on the right side, all of the X-Y coordinate.

The step S18 calculates an endpoint coordinate (Xel, Yel) on the left, and an endpoint coordinate (Xer, Yer) on the right, on the end point side (or the end edge) of a crook line segment; where the post-fix "e" indicates an end point "end" of the X-Y coordinate. These processes calculate the beginning and end point coordinates of a crook line segment (n).

A pattern fixing length P is set by the user in advance (S19). The pattern fixing length P is defined as a length of a section to which a reference coordinate of a dotted line texture pattern is fixed at the time of drawing a crook line part of the dotted line.

Next, the process calculates a dummy apex coordinate of a dummy apex of a pattern fixing part based on the apex coordinate of the crook line segment (n) and the pattern fixing length P set by the user (S20).

The steps S21 and S22 show details of the content of the above noted dummy apex coordinate calculation process. The step S21 calculates the left and right dummy apex coordinates (Xbl', Ybl') and (Xbr', Ybr') from the pattern fixing length P and beginning point coordinates (Xbl, Ybl) and (Xbr, Ybr) of the apexes on the left and right in a viewpoint facing the drawing direction of the crook line segment (n).

The step S22 calculates the left and right dummy apex coordinates (Xel', Yel') and (Xer', Yer') from the pattern fixing length P and the left and right end point coordinates (Xel, Yel) and (Xer, Yer) of the crook line segment (n).

The process calculates a segment length L' which excludes the pattern fixing part (S23), and stores the calculated segment length L' in a register (S24).

Furthermore, it substitute a reference texture end coordinate S_End of the immediate previous crook line segment (n−1) for a reference texture beginning point coordinate S_Begin of the current crook line segment (n) (S25). This process is for drawing the connecting point of two crook line segments by the same pixel data of a reference texture.

Then, it calculates a reference texture end point coordinate (S_End) based on the segment length L', which excludes the pattern fixing part, and reference texture beginning point coordinate S_Begin (S26). The step 27 calculates is for showing the content of the calculation process of the reference texture beginning point coordinate S_End, calculates the reference texture end point coordinate (S_End) from the segment length L' and reference texture beginning point coordinate S_Begin.

At this point, a description is of a coordinate of a reference texture corresponding to a drawing coordinate of the crook line segment (n) by referring to FIG. 9.

Figure 9A:
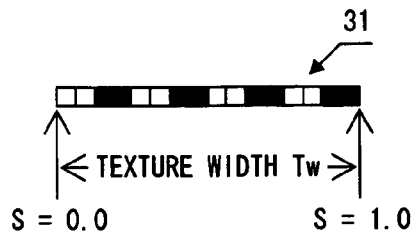
FIGS. 9A, 9B and 9C are description charts of a beginning point coordinate and an end point coordinate of a reference texture.

A reference texture 31 has a predefined texture width Tw arraying two pixels of white data and two pixels of black data alternatively as shown in FIG. 9A.

Figure 9B:
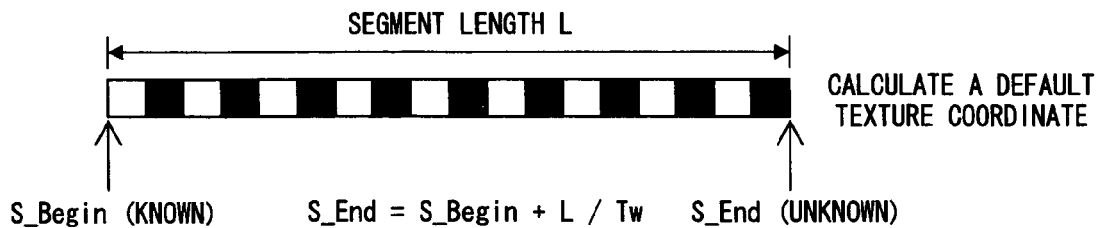

FIG. 9B is a diagram showing a calculation expression of a reference texture end point coordinate S_End in the case of not fixing a dotted line pattern.

Assuming that a beginning point coordinate S_Begin is known, an end point coordinate S_End can be obtained by the following expression as shown in FIG. 9B:

$$S\_End = S\_Begin + L/Tw$$

Figure 9C:
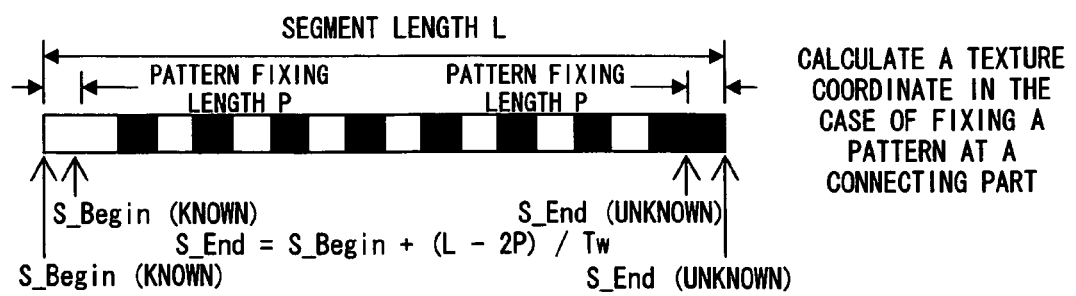
Figure 9C:
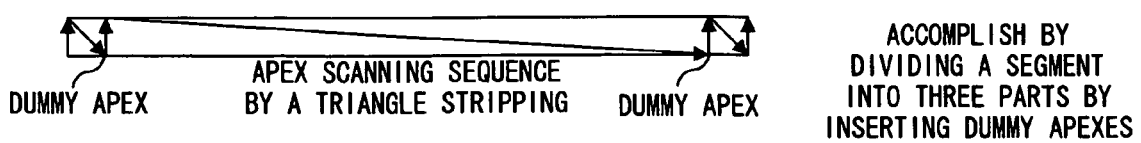

FIG. 9C is a diagram showing a calculation expression of a reference texture end point coordinate S_End, and a zone of a segment divided into three parts by dummy apexes, in the case of fixing a dotted line pattern at a crook line part.

An end point coordinate S_End of a reference texture in the case of drawing a crook line segment of a segment length L can be calculated by the following expression:

$$S\_End = S\_Begin + (L-2P)/Tw$$

In this case, the section of the pattern fixing length P from the beginning edge of the crook line segment is drawn by being fixed by the pixel data of a reference texture designated by the beginning point coordinate S_Begin as shown in FIG. 9C. And the section before the end edge of the crook line segment by the pattern fixing length P is drawn by being fixed by the pixel data of a reference texture designated by the end point coordinate S_End. The section of the pattern fixing length P is applicable to a crook line part of a dotted line.

A coordinate of the dummy apex on the beginning point side of the segment (on the left of the segment of FIG. 9C) shown in FIG. 9C is calculated by adding the pattern fixing length P to the coordinate of the beginning edge of the segment, for example. A coordinate of the dummy apex on the end point side of the segment can be calculated by subtracting the pattern fixing length P from the coordinate of the end edge of the segment. The equipment of dummy apexes on the beginning and end sides of a segment enables an execution of a drawing process by dividing a segment into three zones.

The description returning to FIG. 8, the step S28 carries out a rounding process of the reference texture coordinate (i.e., a coordinate conversion process). The rounding process of the reference texture coordinate calculates a center coordinate of a white or black zone of a texture (i.e., a coordinate designating a white or black pixel which is not applied by a gradation treatment), for example, as a post-correction reference texture beginning point coordinate S_Begin' or reference texture end point coordinate S_End'. The beginning point coordinate and end point coordinate of a texture after applying a rounding process are called a reference texture corrected beginning point coordinate S_Begin', and a reference texture corrected end point coordinate S_End', respectively, with an apostrophe "'" being attached at the end of each character string for indicating that it is a coordinate having been applied by a rounding process, in the following description.

The processes of the steps S29 and S30 show contents of a rounding process of the reference texture coordinate. The step S29 calculates a center coordinate of texture pixels in a zone including the reference texture beginning point coordinate S_begin as a reference texture corrected beginning point coordinate S_begin'. The step S30 calculates a center coordinate of texture pixels in a zone including the reference texture end point coordinate S_End as a reference texture corrected end point coordinate S_End'.

Then the process judges whether or not a coordinate (Xn, Yn) of a pixel of the crook line segment to be drawn exists on the outside of the pattern fixing part (S31).

A judgment of whether or not it is on the outside of the pattern fixing part is made by a judgment of whether or not the coordinate of the pixel to be drawn exists within a zone which is enclosed by four coordinates, i.e., the left beginning point coordinate (Xbl', Ybl'), right beginning point coordinate (Xbr', Ybr'), left end point coordinate (Xel', Yel') and right end point coordinate (Xer', Yer'), of the dummy apex of the crook line segment. Note that the positions of the left and right are determined by the direction facing a progressing direction of a drawing.

If the coordinate (Xn, Yn) of the pixel to be drawn is on the outside of the pattern fixing part ("yes" for the judgment of S31), the process proceeds to the step S32 and calculates a reference texture coordinate (i.e., an address) corresponding to the coordinate (Xn, Yn), followed by reading a texture pixel (i.e., pixel data) designated by the calculated reference texture coordinate from the texture storage area 16c (S33). Then, it draws the readout texture pixel at a position designated by the segment coordinate (Xn, Yn) (S34). When finishing a drawing of a texture pixel for one pixel, the process returns to the step S31 followed by repeating the same process for the next pixel.

If the step S31 judges that the coordinate (Xn, Yn) of the pixel to be drawn exists within the pattern fixing part ("no" for S31), the process proceeds to the step S35 and judges whether or not the coordinate (Xn, Yn) is on the beginning side of the crook line segment.

If the coordinate of the pixel to be drawn is on the beginning side of the crook line segment ("yes" for S35), that is, if the pixel to be drawn exists within a progress stop section of a dotted line pattern and also on the beginning point side of the drawing progress direction of the crook line segment (n), the process proceeds to the step S36 and sets a reference texture corrected beginning point coordinate S_Begin' as a reference texture coordinate.

Having set the reference texture corrected beginning point coordinate S_Begin' as a reference texture coordinate, the step S33 reads pixel data designated by the reference texture corrected beginning point coordinate S_Begin', followed by the step S34 drawing a point of the coordinate (Xn, Yn) of the crook line segment by the readout pixel data.

The above described reference texture corrected beginning point coordinate S_begin' is set by an address a pixel existing at the approximate center of a white or black zone of a dotted line texture. Therefore, even in the case of having a gradation display function, a drawing by fixing with pixel data designated by the reference texture corrected beginning point coordinate S_begin' makes it possible to draw a pixel within a dotted line progress stop section by a white or black pixel, in lieu of a half tone pixel.

Contrarily, if the coordinate (Xn, Yn) of the pixel to be drawn exists on the end point side of the crook line segment (n) ("no" for S35), that is, if the pixel to be drawn exists within a progress stop section of a dotted line pattern and also on the end point side of the crook line segment, the process proceeds to the step S37 and sets a reference texture corrected end point coordinate S_End' as a reference texture coordinate.

Having set the reference texture corrected end point coordinate S_End' as a reference texture coordinate, the step S33 reads pixel data designated by the reference texture corrected end point coordinate S_End', followed by the step S34 drawing a point of the coordinate (Xn, Yn) of a crook line segment by the readout pixel data.

Figure 10A:
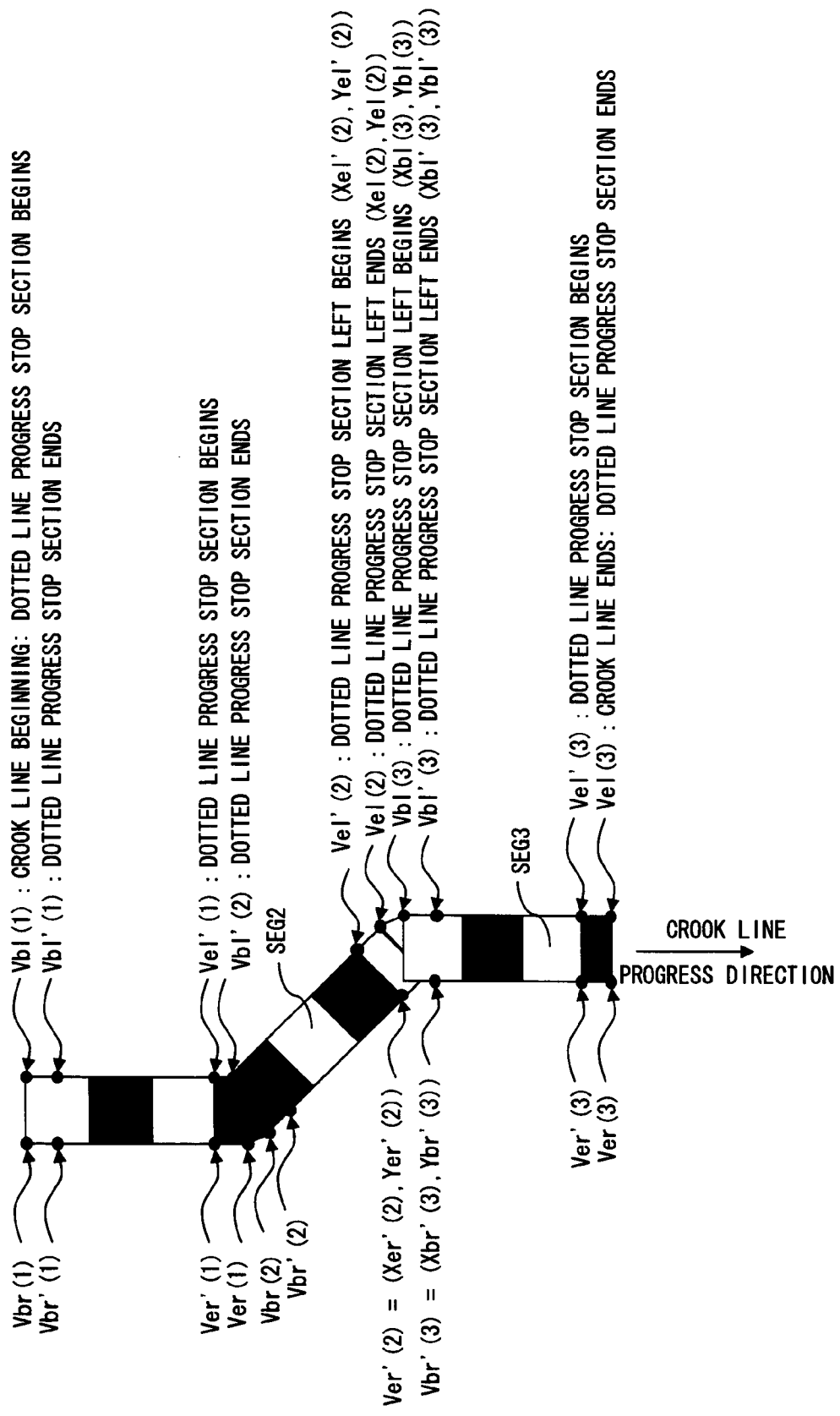
FIGS. 10A and 10B are description chart of a coordinate of a crook line segment.
Figure 10B:
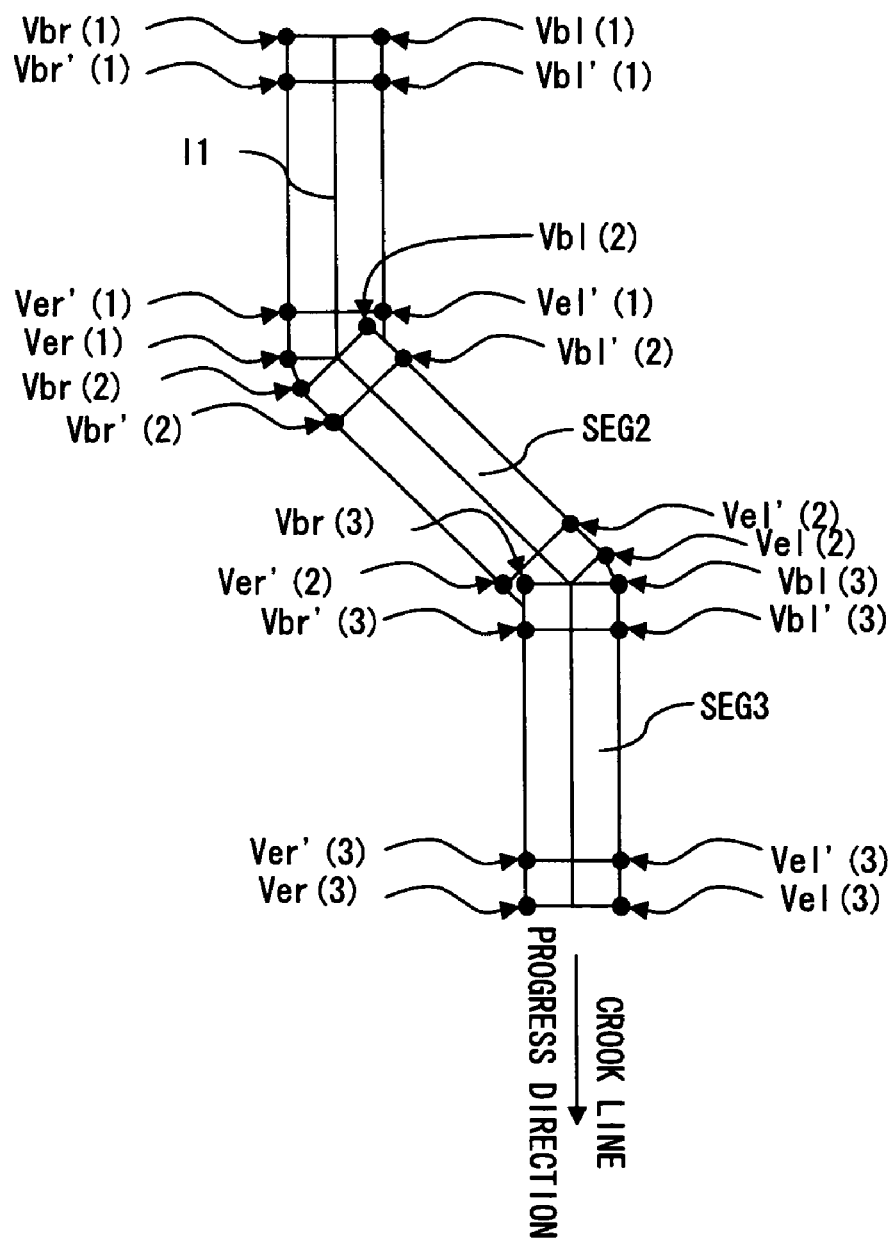
Figure 11:
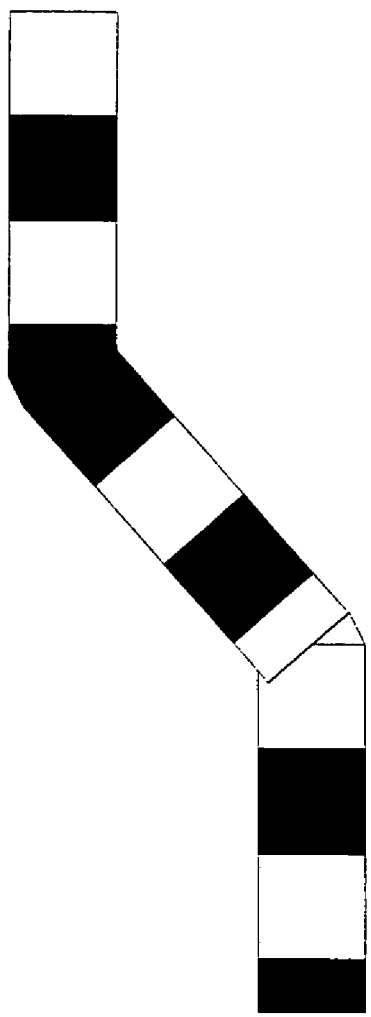
FIG. 11 is a diagram exemplifying a drawing of a dotted line.

At this point, a description is of the case of drawing a dotted line made up of three crook line segments by referring to FIGS. 10 and 11.

FIG. 10A is a diagram showing a dotted line drawn by the dotted line drawing method according to the present embodiment, and a beginning and an end coordinates of a dotted line progress stop section (corresponding to the fixing section), while FIG. 10B is an easy view of FIG. 10A by omitting a pixel of the dotted line therefrom.

Meanwhile, FIG. 11 is a diagram showing a dotted line in the case of drawing a dotted line progress stop section by pixel data designated by a specific reference coordinate and drawing parts other than the dotted line progress stop section by discretionary pixel data of a reference texture.

The next description is of the case of drawing a dotted line of a crook line part in which a second crook line segment SEG 2 and a third crook line segment SEG 3 are connected together, with the direction indicated by an arrow being assumed as the progress direction of the dotted line (i.e., the drawing direction), in the showing of FIGS. 10A and 10B.

The left beginning coordinate (i.e., the dummy apex left coordinate on the end point side) of the dotted line progress stop section on the end point side (i.e., the end edge side) of the second crook line segment SEG 2 is defined as Vel' (2)= (Xel' (2), Yel' (2)), and the left end coordinate (i.e., the left apex coordinate of the segment SEG 2) of the dotted line progress stop section is defined as Vel (2)=(Xel (2), Yel (2)).

And left beginning coordinate (i.e., the left apex coordinate on the beginning edge of the segment SEG 3) of the dotted line progress stop section on the beginning point side of the third crook segment SEG 3 is defined as Vbl (3)=(Xbl (3), Ybl (3)), and the left end point coordinate (i.e., the dummy apex left coordinate) of the dotted line progress stop section is defined as Vbl' (3)=(Xbl' (3), Ybl' (3)).

The left beginning point coordinate Vel' (2) of the dotted line progress stop section and left end point coordinate Vel (2) of the progress stop section on the end point side of the above described crook line segment SEG 2, and the left beginning point coordinate Vbl (3) of the dotted line progress stop section and left end point coordinate Vbl' (3) of the progress stop section of the crook line segment SEG 3 are calculated by the crook line segment apex coordinate calculation process (S16) and dummy apex coordinate calculation process (S20) of the flow chart shown in FIG. 8.

The first is a description of the case of drawing a pixel of the dotted line progress stop section on the end point side of the crook line segment. Having determined a coordinate at which the crook line segment SEG 2 is to be drawn, the process judges whether or not the coordinate exists within a dotted line progress stop section enclosed by the points, i.e., the left beginning point coordinate Vel' (2) and left end point coordinate Vel (2) of the dotted line progress stop section, and the right beginning point coordinate Ver (2) and right end point coordinate Ver' (2) (not shown herein) of the dotted line progress stop section, on the end point side of the segment 2 shown in FIGS. 10A and 10B. If the coordinate of the drawing target exists within the dotted line progress stop section on the end point side of the above noted segment, the process reads pixel data designated by the corrected end point coordinate (i.e., the coordinate corrected to the center coordinate of a zone of a white or black pixel) S_End' of the reference texture and draws the coordinate as the subject of drawing by the readout pixel data. Likewise, a continuous drawing of each pixel within the dotted line progress stop section of the crook line segment SEG 2 by the pixel data designated by the corrected end point coordinate S_End' of the reference texture makes it possible to draw the end edge part of the crook line segment SEG 2 by the pixel data of white pixels (or black pixels) uninfluenced by a gradation.

Note that the dotted line drawing process according to the present embodiment draws the pixels of the section between the left end point coordinate Vel (2) of the progress stop section on the end point side of the cook line segment SEG 2 and left beginning point coordinate Vbl (3) of the dotted line progress stop section of the crook line segment SEG 3, that is, the pixels of the triangle zone between the coordinates Vel (2) and Vbl (3) shown in FIG. 10A, by the same pixel data designated by the corrected end point coordinate S_End' of the reference texture, thereby drawing the crook line part by the white dotted line.

The next is a description of the case of drawing a pixel of the dotted line progress stop section on the beginning point side of the third crook line segment SEG 3. Having determined a coordinate at which the crook line segment SEG 3 is to be drawn, the process judges whether or not the coordinate exists in a zone (i.e., a zone of a fixing section) enclosed by coordinates, i.e., the left beginning point coordinate Vbl (3) and left end point coordinate Vbl' (3) of the dotted line progress stop section, and the right beginning point coordinate (not shown herein) and right end point coordinate Vbr' (3) of the dotted line progress stop section, on the beginning point side of the third crook line segment SEG 3 shown in FIGS. 10A and 10B.

If the coordinate of the drawing target exists within the above described zone, the process reads pixel data designated by the corrected beginning point coordinate S_Begin' (i.e., the center coordinate of the white pixel zone of the texture image in the example shown in FIG. 10A) of the reference texture and draws a point as the subject of drawing by the readout data. Likewise, a continuous drawing of each pixel within the dotted line progress stop section of the crook line segment SEG 3 by the pixel data designated by the corrected beginning point coordinate S_Begin' of the reference texture makes it possible to draw the crook line part of the crook line segment SEG 3 by the white pixel data uninfluenced by a gradation.

The drawing of pixels of the dotted line progress stop section as described above by pixel data designated by a corrected beginning point coordinate (or a corrected end point coordinate) of the reference texture makes it possible to draw a crook line part of the dotted line by pure white or black pixels as shown by FIG. 11. Note that the reason the center coordinate of a white pixel (or black pixel) zone of a reference texture is set as a corrected beginning point coordinate (or a corrected end point coordinate) is that it is possible to obtain pixel data of a white pixel or black pixel without a gradation by designating the center coordinate of the zone.

The above described embodiment is configured to make it possible to draw a pixel of a crook line part by fixing it to a white (i.e., a foreground color) pixel or black (i.e., a background color) pixel which is not applied by a gradation process even in the case of displaying a dotted line by filtering by a half tone. This configuration makes it possible to improve a degradation of a display quality by preventing a display of the entirety of a crook line part of the dotted line in a half tone. The present embodiment also enables drawing a dotted line by adding a gradation characteristic thereto, thereby enabling a smooth display of a change in tones of a contour of the dotted line even though it is thick, and an improvement of the display quality.

Meanwhile, equipping dummy apexes on both ends of a crook line segment used for drawing a dotted line and dividing the crook line segment into three parts make it possible to calculate a section (which is called a dotted line progress section) excluding a section stopping a progress of a dotted line pattern and calculate a reference coordinate of a reference texture relating to each pixel of the dotted line progress section, thereby enabling maintenance of a desired dotted line pitch regardless of a presence or absence of the dotted line progress section. This in turn makes it possible to uniformly draw the dotted line pitch of a dotted line having a crook line part.

The present embodiment is configured to enable a prevention of the entirely of a crook line part of a dotted line from being displayed in a half tone in a drawing apparatus equipped with a gradation display function for the dotted line.

The present invention is not limited by the above described embodiment, and rather may be configured as follows for example:

(1) The present embodiment is configured to calculate the center coordinate of a white pixel or black pixel zone of a reference texture as a corrected beginning point coordinate S_Begin' or a corrected end point coordinate S_End', it is, however, not limited by a method for designating a coordinate. For example, a configuration may be such as to store pixel data of a white pixel, and of a black pixel, of a reference texture to be used for a dotted line progress stop section in a storage apparatus in advance, and draw a pixel of a fixing section by attaching it to pixel data of a white or black pixel stored in the storage apparatus when drawing a pixel of the fixing section.

(2) And the corrected beginning point coordinate S_Begin' and corrected end point coordinate S_End' are not limited to the center coordinate of a white pixel or black pixel zone, but they may be a position displaced from the center. They may be a pixel of a predefined density or higher.

(3) The present invention can also be applied to the case of displaying colors, in lieu of being limited to one drawing a black and white dotted line. The present invention can also be applied to a CAD apparatus, a computer, a map display apparatus and a map display apparatus on board a vehicle.

What is claimed is:

1. A drawing apparatus equipped with the function of displaying a dotted line in gradation, comprising:
    a reference image storage unit for storing a reference dotted line image for drawing the dotted line;
    a judgment unit for judging whether or not a pixel to be drawn exists within a fixing section of a dotted line pattern;
    a drawing unit for drawing a pixel within the fixing section of the dotted line pattern by fixing it to pixel data other than that of the reference dotted line image corresponding to a beginning point of the fixing section if the pixel to be drawn is judged, by the judgment unit, to exist within the fixing section of the dotted line pattern; and
    a dummy apex coordinate calculation unit for calculating a starting dummy apex coordinate and an ending dummy apex coordinate when drawing the dotted line with a crook line part by using a plurality of segments, wherein the starting dummy apex coordinate is obtained by adding a given value to a first coordinate corresponding to a starting edge part of a segment, wherein the ending dummy apex coordinate is obtained by subtracting the given value from a second coordinate corresponding to an ending edge part of the segment,
    wherein the judgment unit judges whether or not the pixel to be drawn exists within one of a first fixing section between the first coordinate and the starting dummy apex coordinate and a second fixing section between the second coordinate and the ending dummy apex coordinate.

2. The drawing apparatus according to claim 1, comprising:
    a first reference coordinate calculation unit for calculating a first reference coordinate of the reference dotted line image corresponding to the beginning point of the fixing section and a second reference coordinate calculation unit for calculating a second reference coordinate for designating pixel data of a specific foreground color pixel or background color pixel by applying a coordinate conversion process to the first reference coordinate calculated by the first reference coordinate calculation unit,
    wherein said drawing unit draws a crook line part of the dotted line by fixing the pixel within the fixing section to pixel data designated by the second reference coordinate.

3. The drawing apparatus according to claim 1, comprising:
    a segment coordinate calculation unit for calculating the first coordinate and the second coordinate.

4. The drawing apparatus according to claim 1, comprising:
    a first reference coordinate calculation unit for calculating a first reference coordinate of the reference dotted line image corresponding to the beginning point of the fixing section, and a second reference coordinate calculation unit for applying a coordinate conversion process to the first reference coordinate calculated by the first reference coordinate calculation unit, thereby calculating a second reference coordinate of the center, or close thereto, of a zone of a foreground color or background color pixel,
    wherein said drawing unit draws a crook line part of the dotted line by fixing the pixel within the fixing section to pixel data designated by the reference coordinate if the pixel to be drawn is judged, by said judgment unit, to exist within the fixing section.

5. The drawing apparatus according to claim 1, comprising:
    a first reference coordinate calculation unit for calculating a first reference coordinate of said reference dotted line image corresponding to the beginning point of the fixing section, a second reference coordinate calculation unit for calculating a second reference coordinate for designating pixel data of a specific foreground color pixel or background color pixel by applying a coordinate conversion process to the first reference coordinate calculated by the first reference coordinate calculation unit, and a dummy apex coordinate calculation unit for calculating a position which is advanced toward an inside from the end edge of said segment by a predetermined distance as a dummy apex coordinate on the end point side, or calculating a position which is advanced toward an inside from the beginning point of the segment by a predetermined distance as a dummy apex coordinate on the beginning point side, when drawing the dotted line with a crook line part by using a plurality of segments, wherein said judgment unit judges whether or not a coordinate of the pixel to be drawn exists within the fixing section between the dummy apex coordinate on the end-point side of a first segment and the end edge of the second segment, or within the fixing section between the beginning edge of a second segment following the first segment and the dummy apex coordinate on the beginning point side of the second segment, and said drawing unit draws the crook line part of the dotted line by fixing the pixel within the fixing section to pixel data designated by the second reference coordinate if the pixel to be drawn is judged, by said judgment unit, to exist within the fixing section.

6. A computer-implemented dotted line drawing method, performed by a processor, for displaying a dotted line in gradation, the method comprising:

storing, in a reference image storage unit, a reference dotted line image for drawing the dotted line;

judging whether or not a pixel to be drawn exists within the fixing section of a dotted line pattern;

drawing the pixel within the fixing section of the dotted line pattern by fixing it to pixel data other than that of the reference dotted line image corresponding to a beginning point of the fixing section if the pixel to be drawn is judged to exist within the fixing section, and calculating a starting dummy apex coordinate and an ending dummy apex coordinate when drawing the dotted line with a crook line part by using a plurality of segments, wherein the starting dummy apex coordinate is obtained by adding a given value to a first coordinate corresponding to a starting edge part of a segment, wherein the ending dummy apex coordinate is obtained by subtracting the given value from a second coordinate corresponding to an ending edge part of the segment, wherein whether the pixel to be drawn exists within one of a first fixing section between the first coordinate and the starting dummy apex coordinate and a second fixing section between the second coordinate and the ending dummy apex coordinate or not is judged.

7. The computer-implemented dotted line drawing method according to claim 6, comprising:

calculating a first reference coordinate of said reference dotted line image corresponding to a beginning point of the fixing section;

calculating a second reference coordinate for designating pixel data of a specific foreground color pixel or background color pixel by applying a coordinate conversion process to the first reference coordinate; and drawing a crook line part of the dotted line by fixing the pixel within the fixing section to pixel data designated by the second reference coordinate.

8. The computer-implemented dotted line drawing method according to claim 6, comprising:

calculating the first coordinate and the second coordinate.

9. The computer-implemented dotted line drawing method according to claim 6, comprising:

calculating a first reference coordinate of said reference dotted line image corresponding to the beginning point of said fixing section;

calculating a second reference coordinate for designating pixel data of a specific foreground color or background color pixel by applying a coordinate conversion process to the first reference coordinate;

calculating a position which is advanced toward an inside from the end edge of said segment by a predetermined distance, or a position which is advanced toward an inside from the beginning point of the segment by a predetermined distance, as a dummy apex coordinate on the end point side or as a dummy apex coordinate on the beginning point side, when drawing the dotted line with a crook line part by using a plurality of segments;

judging whether or not a coordinate of the pixel to be drawn exists within the fixing section between the dummy apex coordinate on the end point side of a first segment and the end edge thereof, or within the fixing section between the beginning edge of a second segment following the first segment and the dummy apex coordinate on the beginning point side of the second segment; and drawing the crook line part of the dotted line by fixing the pixel within the fixing section to pixel data designated by the reference coordinate if the pixel to be drawn is judged, by said judgment unit, to exist within the fixing section.

10. A drawing apparatus equipped with the function of displaying a dotted line in gradation, comprising:

a reference image storage unit for storing a reference dotted line image for drawing the dotted line;

a judgment unit for judging whether or not a pixel to be drawn exists within a fixing section of a dotted line pattern;

a drawing unit for drawing a crook line part of the dotted line by fixing the pixel within the fixing section to pixel data of a foreground color or background color pixel different from the reference dotted line image if the pixel to be drawn is judged, by the judgment unit, to exist within the fixing section of the dotted line pattern, and a dummy apex coordinate calculation unit for calculating a starting dummy apex coordinate and an ending dummy apex coordinate when drawing the dotted line with a crook line part by using a plurality of segments, wherein the starting dummy apex coordinate is obtained by adding a given value to a first coordinate corresponding to a starting edge part of a segment, wherein the ending dummy apex coordinate is obtained by subtracting the given value from a second coordinate corresponding to an ending edge part of the segment , wherein the judgment unit judges whether or not the pixel to be drawn exists within one of a first fixing section between the first coordinate and the starting dummy apex coordinate and a second fixing section between the second coordinate and the ending dummy apex coordinate.

* * * * *